(12) United States Patent
Fujita

(10) Patent No.: US 7,931,119 B2
(45) Date of Patent: Apr. 26, 2011

(54) SUPPORT STRUCTURE FOR EXHAUST PIPE

(75) Inventor: Akihiro Fujita, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 12/802,107

(22) Filed: May 28, 2010

(65) Prior Publication Data

US 2011/0049310 A1 Mar. 3, 2011

(30) Foreign Application Priority Data

Aug. 26, 2009 (JP) ................................. 2009-195237

(51) Int. Cl.
| | |
|---|---|
| F01N 13/08 | (2010.01) |
| F01N 13/10 | (2010.01) |
| F01N 1/00 | (2006.01) |
| B60K 13/04 | (2006.01) |
| B60R 19/02 | (2006.01) |
| B60R 19/03 | (2006.01) |
| B60R 19/04 | (2006.01) |

(52) U.S. Cl. ........ 181/228; 181/227; 181/240; 293/102; 293/120; 293/155; 180/89.2; 180/309; 60/322

(58) Field of Classification Search .................. 181/228, 181/227, 237, 251, 254, 240; 180/89.2, 309; 60/322; 293/102, 120, 155

See application file for complete search history.

(56) References Cited

U.S. PATENT DOCUMENTS

| | | | | |
|---|---|---|---|---|
| 2,841,348 | A | * | 7/1958 | Stahlhuth .......................... 248/65 |
| 5,195,780 | A | * | 3/1993 | Inoue et al. .................... 280/834 |
| 5,966,933 | A | * | 10/1999 | Ishihara et al. .................. 60/322 |
| 6,398,275 | B1 | * | 6/2002 | Hartel et al. .................. 293/102 |
| 6,644,726 | B2 | * | 11/2003 | Fujii et al. ................. 296/203.04 |
| 7,735,602 | B2 | * | 6/2010 | Yasuda et al. .................. 181/227 |
| 2001/0047897 | A1 | * | 12/2001 | Steenackers et al. ......... 180/89.2 |
| 2003/0057014 | A1 | * | 3/2003 | Misaki ........................... 181/240 |
| 2003/0160136 | A1 | * | 8/2003 | Kato ............................... 248/58 |
| 2005/0247516 | A1 | * | 11/2005 | Uegane ......................... 181/228 |
| 2009/0115209 | A1 | * | 5/2009 | Roth .............................. 293/155 |
| 2010/0006369 | A1 | * | 1/2010 | Sugiyama ..................... 181/228 |
| 2010/0071990 | A1 | * | 3/2010 | Amir et al. ..................... 181/228 |

FOREIGN PATENT DOCUMENTS

| | | |
|---|---|---|
| JP | 2005-120847 | 5/2005 |
| JP | 2005-220852 | 8/2005 |
| JP | 2006-183587 | 7/2006 |

* cited by examiner

*Primary Examiner* — Jeffrey Donels
*Assistant Examiner* — Christina Russell
(74) *Attorney, Agent, or Firm* — Flynn, Thiel, Boutell & Tanis, P.C.

(57) ABSTRACT

A support structure for an exhaust pipe includes left and right side frames disposed on a lower side of a rear floor and a back panel extending downward from the rear floor joined to rear end portions of the side frames. Reinforcing plates join the back panel on a vehicle rear side in positions facing the rear of the side frames. Stays extending in a rearward direction mount to the respective reinforcing plates and support a bumper member. A muffler disposed below the rear floor and on a front side of the back panel or an exhaust pipe connected thereto, is supported on a vehicle body by a hanger rubber. A flange portion that is formed with a reinforcing plate extends rearwardly and perpendicularly therefrom. A hanger rubber mounts to the flange portion to support the muffler or exhaust pipe.

6 Claims, 3 Drawing Sheets

SUPPORT STRUCTURE FOR EXHAUST PIPE

FIELD OF THE INVENTION

The present invention relates to a support structure for an exhaust pipe for reducing propagation of vibrations to a vehicle body, preventing thermal deterioration of a hanger rubber, and improving mountability of a muffler to the vehicle body.

BACKGROUND OF THE INVENTION

In a vehicle, in installing a muffler that is a part of an exhaust system, the muffler is installed below a rear floor of the vehicle with a hanger rubber interposed therebetween. The hanger rubber reduces vibrations and shaking of the muffler and suppresses transmission of the vibrations to the vehicle body.

Japan Patent Application Laid-Open No. 2006-183587 discloses a known support structure.

In a prior-art support structure for an exhaust pipe, a muffler to be installed below a rear floor of a vehicle needs to be mounted at a high rigidity and stable position by a hanger rubber so as to reduce vibrations and shaking of the muffler to suppress transmission of the vibrations to the vehicle body. Moreover, it is necessary to prevent thermal deterioration of the hanger rubber caused by heat generated by the muffler.

To solve these problems, i.e., to reduce the vibrations and shakes of the muffler to suppress the transmission of the vibrations to the vehicle body, there is a prior-art structure for fixing a muffler to a high rigidity side frame by a special retaining bracket and a structure using a special mounting part for preventing shaking of the hanger rubber in order to suppress the shaking of the hanger rubber as described in Japan Patent Application Laid-Open No. 2005-120847.

However, these measures require special new parts for stably mounting the hanger rubber, which results in an increase in the number of parts and cost.

To prevent the thermal deterioration of the hanger rubber caused by the heat from the muffler, there is a prior-art structure using a hanger rubber having high heat resistance and a structure using a special heat shield part for shielding from the heat of the muffler as described in the above-described Japan Patent Application Laid-Open No. 2005-220852.

However, these structures involve an increase in cost and the number of parts.

Here, the prior-art support structure of the exhaust pipe will be described in detail.

In the support structure of the exhaust pipe, as shown in FIG. 5, a pair of left and right side frames 108 (the left side frame is not shown) are provided on a lower side of a rear floor 103 of a vehicle 101. A back panel 109 extending downward from the rear floor 103 is joined to rear end portions of the left and right side frames 108. Left and right reinforcing plates 111 (the left reinforcing plate is not shown) are joined to a wall face of the back panel 109 on a vehicle rear side in positions facing the rear end portions of the left and right side frames 108. Left and right stays 113 (the left stay is not shown) extending in a vehicle rearward direction are mounted to the left and right reinforcing plates 111. A bumper member 114 extending in a vehicle width direction is mounted to rear end portions of the left and right stays 113. A muffler 115 is disposed below the rear floor 103 and on a front side of the back panel 109 and is supported on a vehicle body 102 by a hanger rubber or rubber hanger 116.

A special retaining bracket 131 is provided on a side wall of the rear end portion of the right side frame 108. A first pin portion 132 hangs from the special retaining bracket 131. A second pin portion 133 is provided at an upper portion of a rear end face of the muffler 115. The first and second pin portions 132 and 133 are respectively inserted from vehicle front and rear sides into first and second engagement hole portions 134 and 135 formed in the hanger rubber 116 to thereby support the muffler 115 on the vehicle body 102 by the hanger rubber 116.

Exhaust gas flows through the muffler 115 when the vehicle 101 is driven and increases temperature of the muffler 115.

Then, the high-temperature muffler 115 warms a portion around it and warmed hot air rises.

At this time, as is apparent from FIG. 5, a space 118 surrounded with the right side frame 106 and the right reinforcing plate 111 is formed on vehicle rear side and upper side of the muffler 115 and the hanger rubber 116 is located in the space 118.

As a result, the hot air warmed by the muffler 115 rises and stays in the space 118 as shown by white thick arrows in FIG. 5. The hanger rubber 116 located in the space 118 is exposed to the warmed hot air and thermally deteriorates.

Some objects of the present invention are to reduce propagation of vibrations to a vehicle body, to prevent thermal deterioration of the hanger rubber, and to improve mountability of a muffler to the vehicle body in a support structure for an exhaust pipe.

SUMMARY OF THE INVENTION

To eliminate the above-described problems, according to the invention, there is provided a support structure for an exhaust pipe, in which a pair of left and right side frames are provided on a lower side of a rear floor of a vehicle, a back panel extending downward from the rear floor is joined to rear end portions of the side frames, and reinforcing plates are joined to a wall face of the back panel on a vehicle rear side in positions facing the rear end portions of the side frames. Stays extending in a vehicle rearward direction are mounted to the respective reinforcing plates, a bumper member extending in a vehicle width direction is mounted to rear end portions of the stays, a muffler is disposed below the rear floor and on a front side of the back panel, and the muffler or the exhaust pipe connected to the muffler is supported on a vehicle body by a hanger rubber, wherein a flange portion perpendicular to the reinforcing plate, positioned below the bumper member, and extending toward the vehicle rear side with respect to the back panel is formed and the hanger rubber is mounted to the flange portion.

As specifically described above, according to the invention, in the support structure for the exhaust pipe, the pair of left and right side frames are provided on the lower side of the rear floor of the vehicle, the back panel extending downward from the rear floor is joined to the rear end portions of the side frames, and the reinforcing plates are joined to the wall face of the back panel on the vehicle rear side in the positions facing the rear end portions of the side frames. The stays extending in the vehicle rearward direction are mounted to the respective reinforcing plates, the bumper member extending in the vehicle width direction is mounted to the rear end portions of the stays, the muffler is disposed below the rear floor and on the front side of the back panel, and the muffler or the exhaust pipe connected to the muffler is supported on the vehicle body by the hanger rubber. In this structure, the flange portion perpendicular to the reinforcing plate, positioned below the bumper member, and extending toward the vehicle rear side with respect to the back panel is formed and the hanger rubber is mounted to the flange portion.

As a result, in the support structure for the exhaust pipe, it is possible to achieve the objects, i.e., to reduce the propagation of the vibrations to the vehicle body, to prevent the thermal deterioration of the hanger rubber, and to improve the mountability of the muffler to the vehicle body and it is possible to obtain a vibration reducing (stabilizing) effect, a thermal deterioration preventing effect, and a mountability improving effect.

Embodiments of the present invention will be described in detail below with reference to the drawings.

DETAILED DESCRIPTION OF THE INVENTION

FIGS. 1 to 4 show embodiments of the invention.

Figure 2:
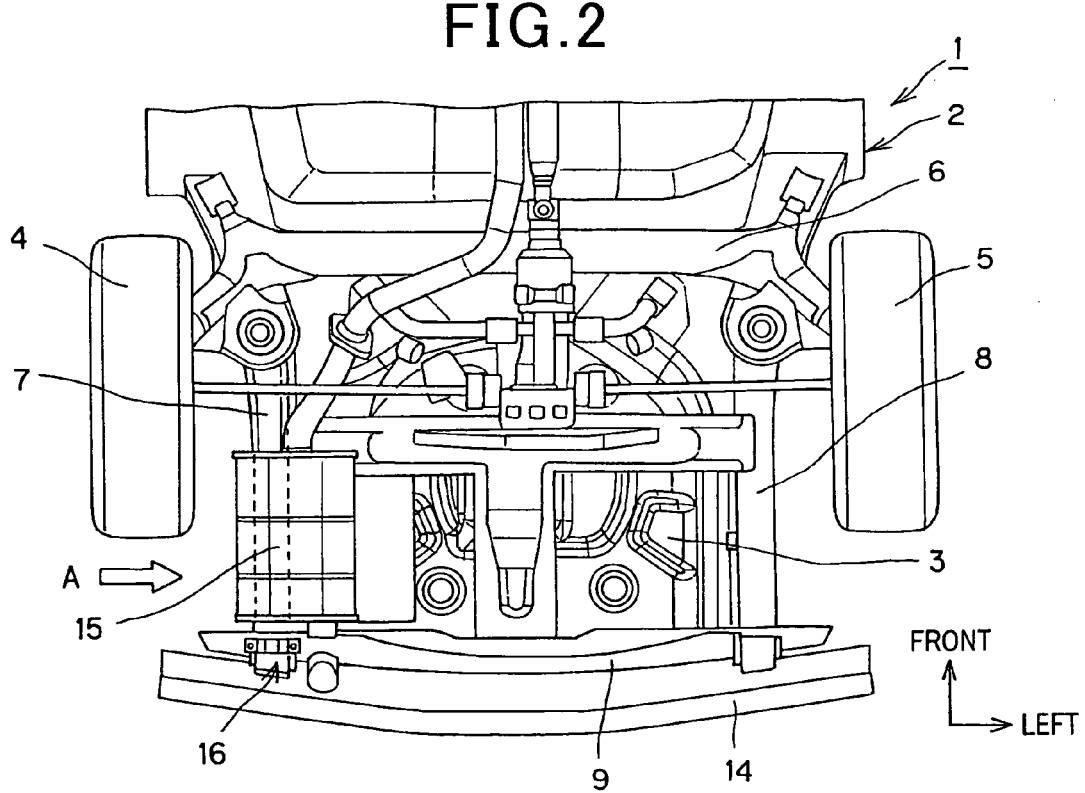
FIG. 2 is a bottom view of a rear portion of the vehicle shown in FIG. 1.
Figure 3:
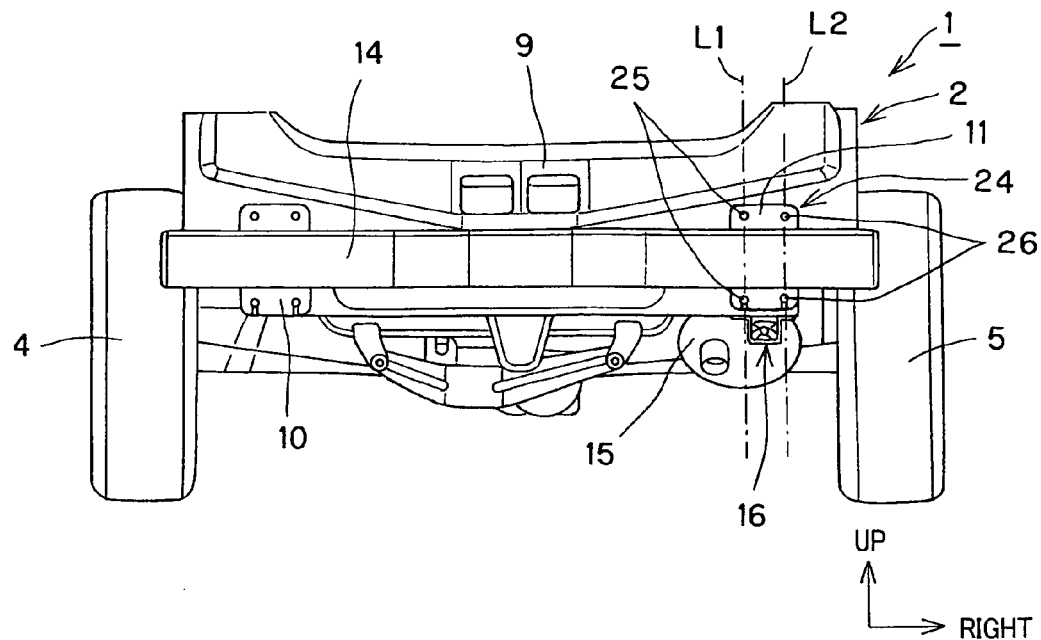
FIG. 3 is a back view of the vehicle and showing the rear portion of the vehicle shown in FIGS. 1 and 2.

In FIGS. 2 and 3, reference numeral 1 designates a vehicle, 2 designates a vehicle body, 3 designates a rear floor, while 4 and 5 designate left and right rear wheels mounted to a suspension arm 6. Reference numerals 7 and 8 designate a pair of left and right side frames, i.e., 7 designates the left side frame and 8 designates the right side frame.

In a support structure of the vehicle 1, as shown in FIGS. 1 to 4, the pair of left and right side frames 7 and 8 are provided on a lower side of the rear floor 3 of the vehicle 1 and a back panel 9 extending downward from the rear floor 3 is joined to rear end portions 7a and 8a of the left and right side frames 7 and 8.

Figure 4:
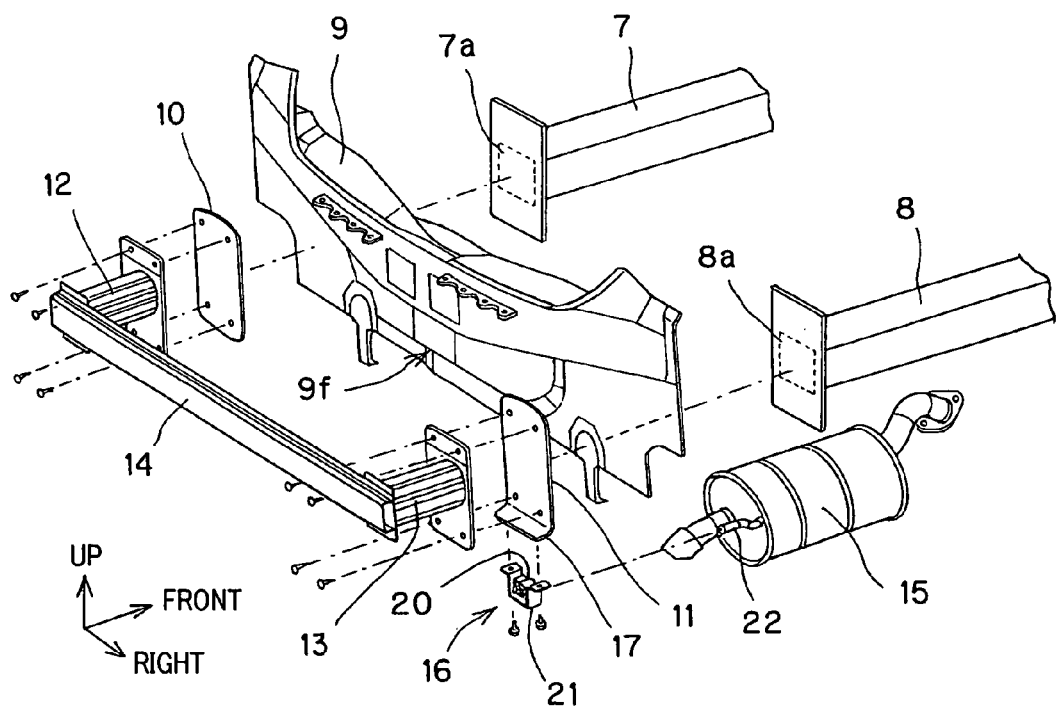
FIG. 4 is a structural exploded perspective view of parts in an exhaust system for the embodiment shown in FIGS. 1-3.
Figure 5:
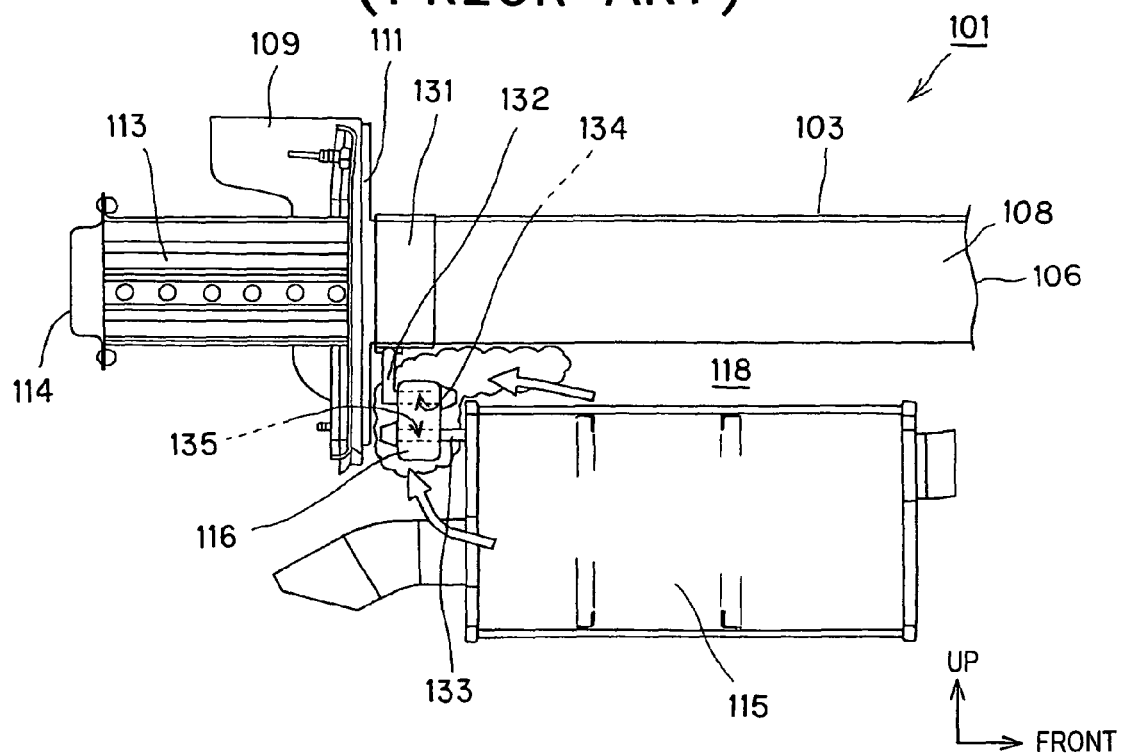
FIG. 5 is an enlarged side view of an essential portion of a muffler of a prior art vehicle.

As show in FIG. 4, left and right respective reinforcing plates 10 and 11 are joined to a wall face 9f of the back panel 9 on a vehicle rear side in positions facing the rear end portions 7a and 8a of the left and right side frames 7 and 8.

Left and right stays 12 and 13 extending in a vehicle rearward direction are respectively mounted to the left and right reinforcing plates 10 and 11 and a bumper member 14 extending in a vehicle width direction is mounted to rear end portions of the left and right stays 12 and 13.

As shown in FIGS. 1 to 4, a muffler 15 is disposed below the rear floor 3 and on a front side of the back panel 9 and the muffler 15 (or an exhaust pipe connected to the muffler) is supported on the vehicle body 2 by a hanger rubber or rubber hanger 16.

At this time, a flange portion 17 located below the bumper member 14 in a vertical direction and extending toward a vehicle rear side with respect to the back panel 9 is formed at the right reinforcing plate 11 and the hanger rubber 16 is mounted on the flange portion 17.

In the embodiment of the invention, it is possible to obtain a vibration reducing (stabilizing) effect, a thermal deterioration preventing effect, and a mountability improving effect with the above-described structure.

Normally, the bumper member 14, the left and right stays 12 and 13, and the left and right side frames 7 and 8 of the vehicle 1 have high rigidity and are less likely to shake or twist due to the vibrations.

Figure 1:
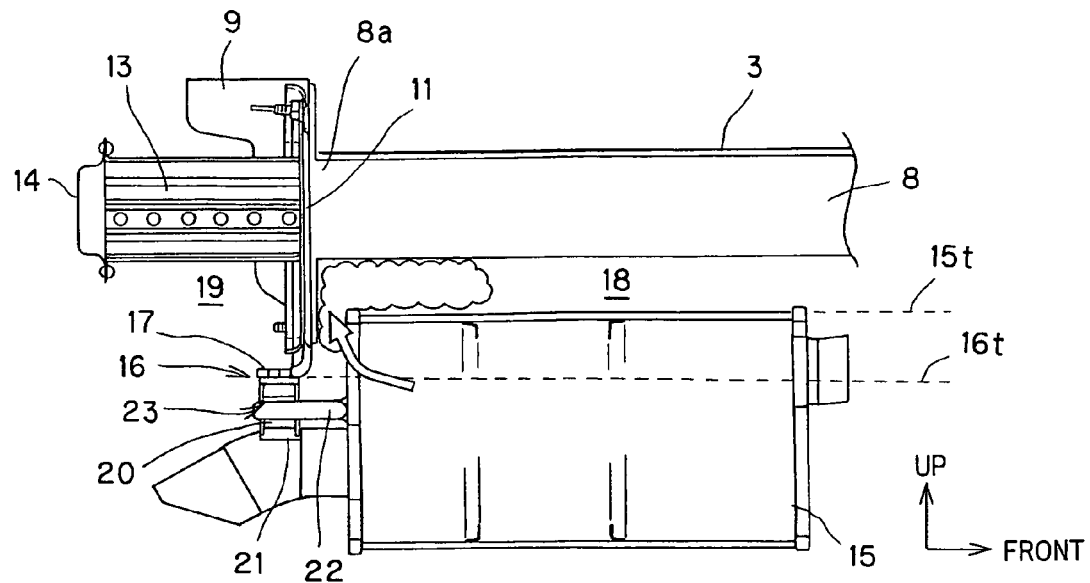
FIG. 1 is an enlarged side view that includes an essential portion of a muffler of a vehicle seen in a direction of arrow A in FIG. 2.

By using this effect, the left and right reinforcing plates 10 and 11 are sandwiched between the bumper member 14 or the left and right stays 12 and 13, and the left and right side frames 7 and 8 from opposite sides and firmly fastened together as shown in FIGS. 1 and 4. Therefore, the left and right reinforcing plates 10 and 11 are securely fixed to the vehicle body by the high rigidity bumper member 14 and left and right side frames 7 and 8. As a result, the left and right reinforcing plates 10 and 11 become less likely to shake and twist due to the vibrations and are disposed on the vehicle body 2 in stable states.

Moreover, in the structure described as the characteristic portion of the invention, the existing reinforcing plate, which is the right reinforcing plate 11 in one embodiment, is used effectively. By adding, to the right reinforcing plate 11, a new function as a seating face for mounting the hanger rubber 16 on which the muffler 15 is mounted, the right reinforcing plate 11 performs not only the function as a reinforcing plate in mounting of the bumper member 14 and the right stay 13 to the vehicle body 2 as in the prior art, but also the new function of stably fixing the muffler 15 and the hanger rubber 16 to thereby reduce the vibrations (shakes and twist) of the muffler 15 and the hanger rubber 16.

At this time, even if the muffler 15 vibrates, the muffler 15 is mounted to the high rigidity portion (the right reinforcing plate 11) by the hanger rubber 16, and therefore the right reinforcing plate 11 can efficiently reduce propagation of the vibrations from the muffler 15 to a vehicle interior.

Moreover, with the structure described as the characteristic portion of the invention, by mounting the hanger rubber 16 to the flange portion 17 of the right reinforcing plate 11 and extending toward the rear side of the vehicle with respect to the back panel 9, it is possible to dispose the hanger rubber 16 not in the space 18 in which the muffler 15 is disposed, but in another space 19 open below the bumper member 14 and the right stay 13 as shown in FIGS. 1 and 4.

As a result, the hanger rubber 16 is not exposed to heat rising up from the muffler 15 and the warmed hot air staying above the muffler 15 as shown in the white thick arrow in FIG. 1, and it is possible to prevent thermal deterioration of the hanger rubber 16.

Moreover, because the hanger rubber 16 is disposed in the other space 19 below the bumper member 14, instead of the space 18 below the rear floor 3, an assembly worker does not need to reach into the deep, narrow, and intricate space 18 where the muffler 15 is disposed to mount a rear portion of the muffler 15 to the hanger rubber 16 by groping to insert the rear portion of the muffler 15 into the hanger rubber 16.

In other words, the assembly worker can visually recognize the hanger rubber 16 from behind or under the vehicle. As a result, the assembly worker can easily mount the rear portion of the muffler 15 to the hanger rubber 16 while directly looking at the hanger rubber 16.

Therefore, according to the invention, by easily working and effectively utilizing the existing right reinforcing plate 11, it is possible not only to stably mount the muffler 15 to the vehicle body 2 to reduce the propagation of the vibrations to the vehicle body 2, but also to prevent the thermal deterioration of the hanger rubber 16 without causing the additional increase in the number of parts and cost. Moreover, the invention improves mountability of the muffler 15.

The hanger rubber 16 is made up of a rubber portion 20 for retaining the rear portion of the muffler 15 and a mount bracket 21 which is a substantially U-shaped piece of hardware open at its upper portion and in which the rubber portion 20 is retained. The rubber portion 20 is secured to the flange portion 17 of the right reinforcing plate 11 by the mount bracket 21.

At this time, as shown in FIGS. 1 and 4, a pin portion 22 is provided to the rear portion of the muffler 15 and an engagement hole portion 23 is formed in the rubber portion 20 of the hanger rubber 16. By inserting the pin portion 22 into the engagement hole portion 23 formed in the rubber portion 20 of the hanger rubber 16 from the vehicle front side, the muffler 15 is supported on the vehicle body 2 by the hanger rubber 16.

In the embodiments of the invention, it is possible to obtain a vibration reducing effect.

In other words, with the structure described as the characteristic portion of the invention, the flange portion 17 of the right reinforcing plate 11 and the mount bracket 21 can suppress the vibrations (an oscillation amount, a moving amount, shakes and twists) of the rubber portion 20 generated by the vibrations of the muffler 15.

In this way, because the mount bracket 21 is the piece of hardware that can suppress displacement of part of or the whole rubber portion 20 when the rubber portion 20 tries to oscillate seriously, it is possible to reduce the vibrations (shakes and twists) and the oscillation of the rubber portion 20.

Therefore, by mounting the hanger rubber 16 to the right reinforcing plate 11 having high rigidity, it is possible not only to reduce the vibrations transmitted to the vehicle body 2, but also to suppress the vibrations and the oscillation of the hanger rubber 16 generated by the vibrations of the muffler 15 to thereby further suppress propagation of the vibrations to the vehicle body 2 or the vehicle interior.

A length of the flange portion 17 of the right reinforcing plate 11 in the vehicle width direction is set to be longer than a length of the right side frame 8 in the vehicle width direction.

In the embodiment of the invention, it is possible to obtain the vibration reducing (stabilizing) effect.

In other words, with the structure described as the characteristic portion of the invention, by mounting the hanger rubber 16 to the right reinforcing plate 11 longer (or wider) than the right side frame 8 in the vehicle width direction as shown in FIGS. 2 and 3, it is possible to obtain a wider distance between mounting points at which the mount bracket 21 of the hanger rubber 16 is mounted to the flange portion 17 as compared with a case in which the hanger rubber 16 is mounted to the right side frame 8.

As a result, the hanger rubber 16 can be fixed to the vehicle body 2 (the right reinforcing plate 11) in a stable state against the vibrations and the hanger rubber 16 becomes less likely to shake and twist due to the vibrations from the muffler 15.

Therefore, in the structure described as the characteristic portion of the invention, by employing the right reinforcing plate 11 long in the vehicle width direction as an area in which the hanger rubber 16 is mounted, it is possible to suppress the shakes and twists of the hanger rubber 16 that vibrates due to the muffler 15 to thereby further reduce propagation of the vibrations to the vehicle body 2.

A fixing portion 24, where the bumper member 14 or the right stay 13 is fixed to the right reinforcing plate 11, includes first fixing portions 25 positioned on an inner side in the vehicle width direction and second fixing portions 26 positioned on an outer side in the vehicle width direction. In a back view of the vehicle, a first imaginary axis L1 passing through the first fixing portions 25 in a vehicle vertical direction and a second imaginary axis L2 passing through the second fixing portions 26 in the vehicle vertical direction are provided and the hanger rubber 16 is disposed between the first imaginary axis L1 and the second imaginary axis L2.

In the embodiments of the invention, it is possible to obtain the vibration reducing (stabilizing) effect.

In other words, with the structure described as the characteristic portion of the invention, by disposing the hanger rubber 16 between the first imaginary axis L1 and the second imaginary axis L2 in the back view of the vehicle 1 as shown in FIG. 3, it is possible to fix the hanger rubber 16 in an area where the right reinforcing plate 11 is the least likely to twist.

As a result, it is possible to stably secure the hanger rubber 16 to the vehicle body 2 and it is possible to further stably mount the muffler 15 on the vehicle body 2.

Moreover, the hanger rubber 16 is disposed so that its top end portion 16t is in a lower position than a top end portion 15t of the muffler 15.

In the embodiments of the invention, it is possible to obtain a thermal deterioration preventing effect.

In other words, with the structure described as the characteristic portion of the invention, heat generated from the muffler 15 and warmed air rise upward from the muffler 15 and the heat and the warmed air above the muffler 15 stay in the space 18 as shown in FIG. 1.

At this time, in the structure described as the characteristic portion of the invention, the top end portion 16t of the hanger rubber 16 is disposed in the lower position than the top end portion 15t of the muffler 15 as shown in FIG. 1. Therefore, the hanger rubber 16 is not exposed to the heat rising upward from the muffler 15 and the warmed air staying in the space 18 above the muffler 15, and it is possible to reliably suppress thermal deterioration of the hanger rubber 16.

In the back view of the vehicle, the flange portion 17 is disposed below the bumper member 14 and the hanger rubber 16 is disposed to protrude in a vehicle downward direction from a lower face of the flange portion 17 so that the flange portion 17 of the right reinforcing plate 11 does not overlap the bumper member 14 and the right stay 13 in the vehicle front-rear direction.

In the embodiments of the invention, it is possible to obtain a mountability improving effect.

In other words, with the structure described as the characteristic portion of the invention, the flange portion 17 of the right reinforcing plate 11 is disposed below the bumper member 14 and the right stay 13, and the hanger rubber 16 protrudes in the vehicle downward direction from the lower face of the flange portion 17 in the back view of the vehicle as shown in FIGS. 1, 3, and 4. Therefore, the bumper member 14, the right stay 13, and the hanger rubber 16 do not overlap each other in the vehicle front-rear direction and the assembly worker can reliably look at the hanger rubber 16 from behind or under the vehicle in mounting the muffler 15 to the hanger rubber 16.

As a result, the assembly worker can reliably look at the hanger rubber 16 and can easily mount the muffler 15 to the hanger rubber 16, which lightens a workload of the assembly worker and reduces installation time.

Consequently, the invention increases visibility of the hanger rubber 16 to thereby further improve mountability.

What is claimed is:
1. A support structure for an exhaust pipe, in which a pair of left and right side frames are provided on a lower side of a rear floor of a vehicle, a back panel extending downward from the rear floor is joined to rear end portions of the side frames, reinforcing plates are joined to a wall face of the back panel on a vehicle rear side in positions facing the rear end portions of the side frames, stays extending in a vehicle rearward direction are mounted to the respective reinforcing plates, a bumper member extending in a vehicle width direction is mounted to rear end portions of the stays, a muffler is disposed below the rear floor and on a front side of the back panel, and the muffler or the exhaust pipe connected to the muffler is supported on a vehicle body by a hanger rubber, wherein a flange portion perpendicular to the reinforcing plate, positioned below the bumper member, and extending toward the vehicle rear side with respect to the back panel is formed, and the hanger rubber is mounted to the flange portion.

2. The support structure for the exhaust pipe according to claim 1, wherein the hanger rubber comprises a rubber portion for retaining a rear portion of the muffler and a mount bracket which is a U-shaped piece of hardware open at its upper portion and in which the rubber portion is retained, and the rubber portion is secured to the flange portion of the reinforcing plate by the mount bracket.

3. The support structure for the exhaust pipe according to claim 2, wherein a length of the flange portion of the reinforcing plate in a vehicle width direction is longer than a length of the side frame in the vehicle width direction.

4. The support structure for the exhaust pipe according to claim 3, wherein a fixing portion where the bumper member or the stay is fixed to the reinforcing plate includes first fixing portions positioned on an inner side of the reinforcing plate in the vehicle width direction and second fixing portions positioned on an outer side of the reinforcing plate in the vehicle width direction, in a back view of the vehicle, a first imaginary axis passing through the first fixing portions in a vehicle vertical direction and a second imaginary axis passing through the second fixing portions in the vehicle vertical direction are provided, and the hanger rubber is disposed between the first imaginary axis and the second imaginary axis.

5. The support structure for the exhaust pipe according to claim 1, wherein a top end portion of the hanger rubber is disposed in a lower position than a top end portion of the muffler.

6. The support structure for the exhaust pipe according to claim 1, wherein, in the back view of the vehicle, the flange portion is disposed below the bumper member and the hanger rubber is disposed to protrude in a vehicle downward direction from a lower face of the flange portion so that the flange portion of the reinforcing plate does not overlap the bumper member and the stay in a vehicle front-rear direction.

* * * * *